United States Patent
Stubler et al.

(10) Patent No.: US 9,617,697 B2
(45) Date of Patent: Apr. 11, 2017

(54) DEVICE FOR DAMPING VIBRATIONS IN A CABLE

(71) Applicant: SOLETANCHE FREYSSINET, Rueil Malmaison (FR)

(72) Inventors: Jérôme Stubler, Paris (FR); Erik Mellier, Versailles (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 15/031,122

(22) PCT Filed: Oct. 22, 2014

(86) PCT No.: PCT/FR2014/052693
§ 371 (c)(1),
(2) Date: Apr. 21, 2016

(87) PCT Pub. No.: WO2015/059413
PCT Pub. Date: Apr. 30, 2015

(65) Prior Publication Data
US 2016/0273174 A1  Sep. 22, 2016

(30) Foreign Application Priority Data
Oct. 23, 2013 (FR) ...................... 13 60318

(51) Int. Cl.
*E01D 11/00* (2006.01)
*E01D 19/16* (2006.01)
*F16F 15/02* (2006.01)
*E01D 11/04* (2006.01)

(52) U.S. Cl.
CPC .............. *E01D 19/16* (2013.01); *E01D 11/04* (2013.01); *F16F 15/02* (2013.01)

(58) Field of Classification Search
CPC ........... E01D 11/04; E01D 19/16; F16F 15/02
USPC ...................................... 404/18–23
See application file for complete search history.

(56) References Cited

U.S. PATENT DOCUMENTS

| | | | | |
|---|---|---|---|---|
| 4,280,600 A | * | 7/1981 | Salmon | F16F 9/36 188/312 |
| 4,648,147 A | | 3/1987 | Zimmermann et al. | |
| 5,173,982 A | * | 12/1992 | Lovett | E01D 19/16 14/22 |
| 6,334,608 B1 | | 1/2002 | Stubler | |

(Continued)

FOREIGN PATENT DOCUMENTS

| | | |
|---|---|---|
| DE | 29517250 U1 | 12/1995 |
| EP | 0343054 A1 | 11/1989 |

(Continued)

*Primary Examiner* — Raymond W Addie
(74) *Attorney, Agent, or Firm* — Dentons US LLP

(57) ABSTRACT

A device (22) for damping vibrations in a cable (16) comprises an arm (25) oscillating about a pivot (26), a first damper (30) for damping the oscillations of the arm, a coupler (27) attached to the cable, a second, linear-travel damper (31) having an upper end connected to the coupler and a lower end connected to the arm, and a guide (28) for sliding the coupler with respect to the arm parallel to the travel of the second damper such that the movements of the cable that are transverse to the travel of the second damper are transmitted to the arm independently of the second damper.

14 Claims, 5 Drawing Sheets

(56) References Cited

U.S. PATENT DOCUMENTS

2007/0061982 A1* 3/2007 Lecinq .................... E01D 19/16
                                                            14/22
2011/0277252 A1* 11/2011 Stubler .................. E01D 19/16
                                                            14/22

FOREIGN PATENT DOCUMENTS

| FR | 2 664 920 A1 | 1/1992 | | |
|---|---|---|---|---|
| FR | 2 854 217 A1 | 10/2004 | | |
| FR | 2859260 A1 | 3/2005 | | |
| JP | 05039606 | * | 2/1993 | ............. E01D 11/00 |
| JP | 6-58369 A | 3/1994 | | |
| JP | 6-58370 A | 3/1994 | | |
| JP | 9-59921 A | 3/1997 | | |
| JP | 11-172618 A | 6/1999 | | |
| JP | 2000136508 A | 5/2000 | | |
| WO | 98/04780 A1 | 2/1998 | | |

* cited by examiner

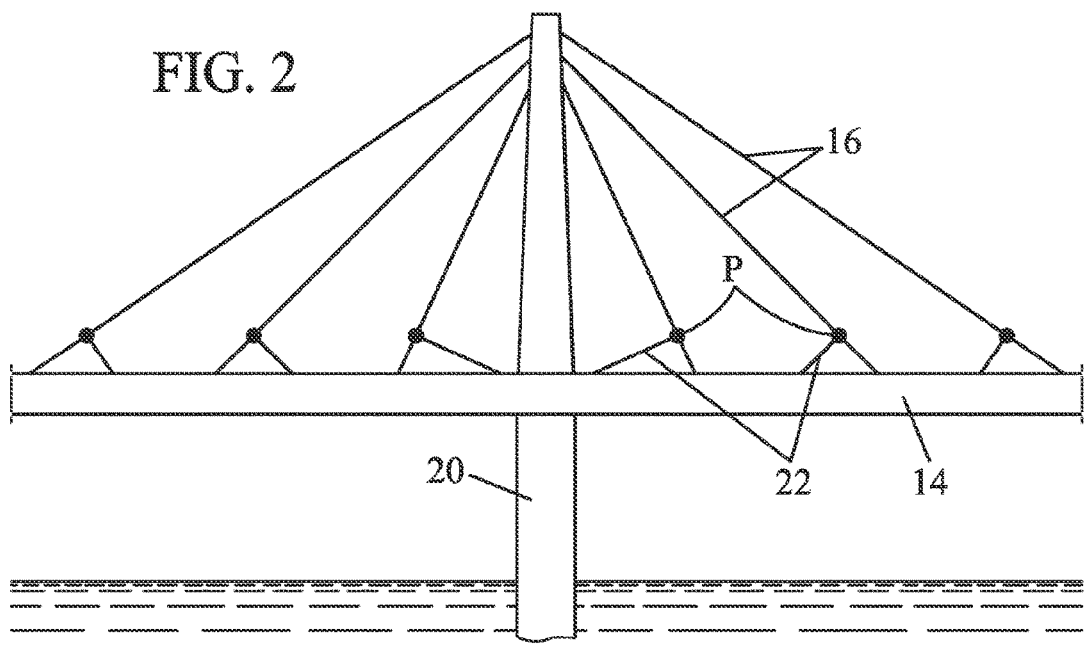
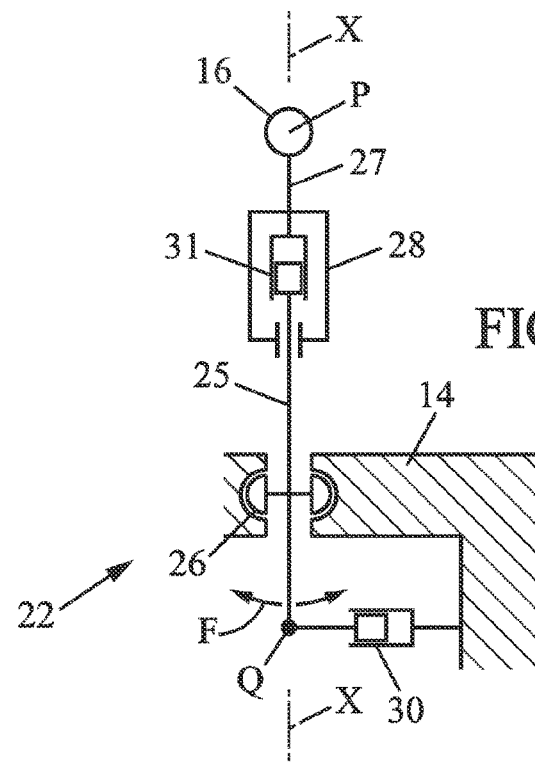

DEVICE FOR DAMPING VIBRATIONS IN A CABLE

This application is a National Stage Application of International Application No. PCT/FR2014/052693 filed Oct. 22, 2014, which claims priority from French Patent Application No. 1360318 filed on Oct. 23, 2013, each of which are hereby incorporated by reference in their entirety.

The present invention relates to techniques for damping vibrations to which cables used for suspending structures are subjected.

BACKGROUND

It applies in particular to bridge cable-stayed suspensions. The stays vibrate in particular because of the wind and the vehicle traffic. Various types of device have been proposed for damping these vibrations.

In a first type of damping device (see for example EP 0 343 054 A1, DE 295 17 250 U1 or WO 98/04780 A1), the vibratory energy is dissipated around the cable, in a zone delimited radially by an element fixed to the suspended structure. This element may be an arm extending between the cable and the suspended structure, or a tube receiving the bottom part of the cable. The amplitudes of the damped vibrations are limited with this type of device.

Other devices use linear-stroke dampers such as hydraulic pistons. These pistons may be disposed on arms extending between the cables and the suspending structure (see for example JP 09-59921 A) or between the cable and a tube fixed to the suspended structure and containing the bottom part of the cable (see for example FR 2 859 260 A1 or JP 06-58370 A).

A so-called pendular damping device comprises an oscillating arm connected to the cable, the oscillations of which are damped by viscous friction. FR 2 664 920 A1 describes an example of such a pendular device.

In an embodiment of the pendular damping device as depicted in FIG. 1, the arm 10 oscillates about a pivot 11 installed on a support 12 itself pivoting on a chassis 13 fixed to the bridge deck 14. Two hydraulic pistons 15 disposed in an X are mounted between the bottom part of the arm 10 and the chassis 13 or the deck 14. The vertical movements of the stay 16, held in a coupler 17 at the top part of the arm 10, are damped by the pistons 15 when the arm 10 moves up and down, the vertical movements of the pivot 11 being accepted by inclination of the support 12. The horizontal movements of the stay 16 make the arm 10 oscillate about the pivot 11 and are damped differentially by the crossed pistons 15.

The pendular device provides strong damping on the cables, in particular long cables. It is typically situated at the bottom part of the cable, at approximately 2%-3% of its total length from the bottom anchorage. The design of this device makes it possible to damp both the vertical and transverse movements of the cable, over long strokes, around typically ±100 mm to approximately ±150 mm.

However, the deviations of the cables are sometimes even greater, in particular when the structure is flexible. The necessary strokes are even greater, and may for example range up to ±700 mm.

The concept of the pendular device then therefore has its limits since the pistons have very long strokes, the device becomes excessively bulky, as shown by FIG. 1. A damping piston typically has a length of three times its stroke, so that there may be a need for pistons more than 2 metres long. It becomes almost impossible to position such a bulky pendular device on a bridge.

An object of the present invention is to improve the pendular device and to facilitate insertion thereof in the structure, in particular if the amplitudes of the vibrations to be damped are large.

SUMMARY

A device for damping vibrations of a cable, in particular a bridge stay, is proposed, which device comprises:
an arm oscillating about a pivot;
a first damper for damping at least some of the oscillations of the arm;
a coupler attached to the cable;
a second damper having a linear-stroke, an upper end connected to the coupler and a lower end connected to the arm; and
a guide for letting the coupler slide with respect to the arm parallel to the stroke of the second damper so that movements of the cable transverse to the stroke of the second damper are communicated to the arm independently of the second damper.

The guide forms a kind of slide that effects a decoupling between the movements of the cable perpendicular to the arm, which are damped by the first damper, and the movements parallel to the arm, which are damped by the second damper. The second damper may have a relatively long stroke without affecting too severely the overall size of the device and its aesthetic appearance. The guide prevents it from being subjected to bending moments detrimental to its functioning.

In an embodiment of the device, the first damper comprises at least one piston disposed transversely to the arm and connected to the arm below the pivot. The piston may be placed under an upper face of the structure suspended by means of the cable, in particular in the case where the pivot is positioned relative to the arm so that a distance between the pivot and a point of attachment of the coupler on the cable is greater than the lever arm, relative to the pivot, of the force exerted by the piston on the arm. The difference in lever arm, relative to the pivot, between the transverse forces applied by the vibrating cable and the resistance opposed by the piston of the first damper enables this piston to have a reduced stroke. It may therefore be of limited size and be housed in a cavity provided in the suspended structure. Advantageously, the leverage is increased by providing for the distance between the pivot and the point of attachment of the coupler to be at least three times larger than the lever arm, relative to the pivot, of the force exerted by the piston on the arm.

The pivot, when it is placed within the thickness of the structure suspended by means of the cable, may be made invisible to persons travelling on this structure. It advantageously provides a ball joint or gimbal type of articulation, which enables the device to accept movements of the coupler parallel to the axis of the cable, due for example to its thermal expansion. Provision can be made for the pivot to be substantially fixed with respect to a structure suspended by means of the cable.

Another aspect of the present invention relates to a cable-stayed bridge, comprising at least one tower, a deck, stays consisting of cables extending obliquely between the tower and the deck in order to suspend the deck, and, mounted between at least one cable on the deck, a damping device as defined above.

BRIEF DESCRIPTION OF THE DRAWINGS

Other features and advantages of the present invention will emerge from the following description of a non-limitative example embodiment, with reference to the accompanying drawings, in which:

FIG. 2 is a schematic profile view of a cable-stayed bridge;

FIG. 3 is a diagram illustrating the kinematics of an example of a damping device according to the invention;

DESCRIPTION OF THE EMBODIMENTS

Figure 1:
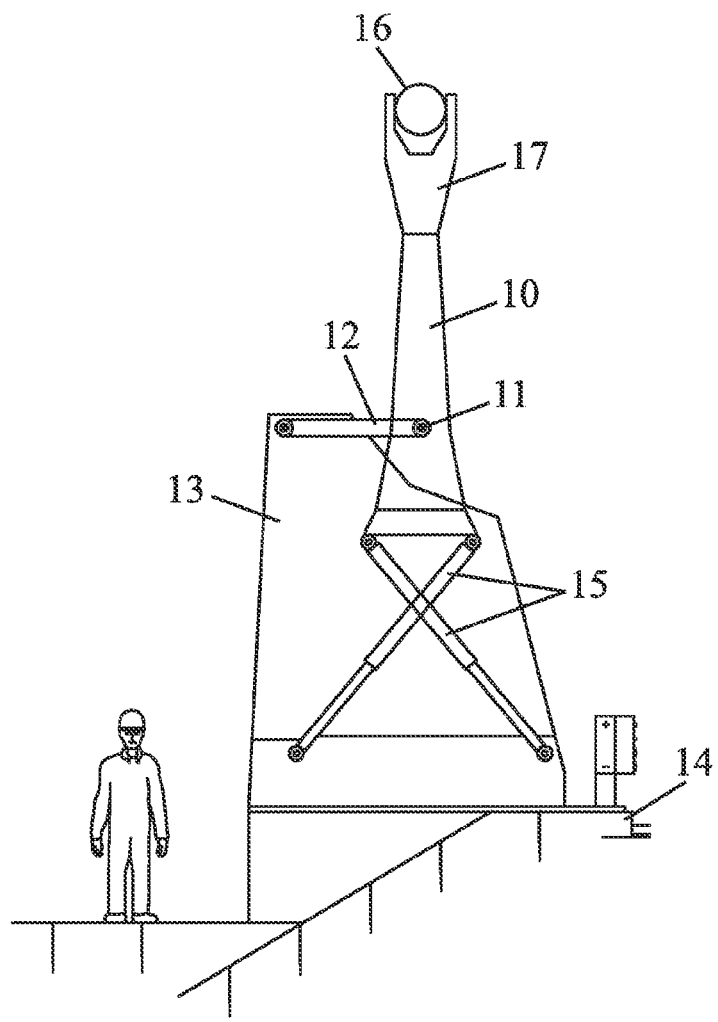
FIG. 1 is a diagram of a previously known pendular damping device.

The invention is described below in a non-limitative application to cable-stayed bridges. The cables the vibrations of which are to be damped are then stays 16 that extend between a tower 20 of the bridge and its deck 14 in order to suspend the deck 14.

One or more of the stays 16 are equipped with a damping device 22 comprising an arm that extends transversely to the stay 16 between an attachment point P situated in the vicinity of its lower anchorage (for example at a few % of the total length of the stay) and the deck 14. In general, the arm of the damping device 22 is situated substantially in the same vertical plane as the stay 16 to which it is connected. However, it is possible for the arm to slightly deviate from this plane.

FIG. 3 shows schematically the kinematics of a damping device 22 such as the one depicted in FIG. 2. The arm 25 of the device 22 is oriented in a direction denoted X and articulated on the deck of the bridge by means of a pivot 26, for example of the ball joint type. It may also oscillate about the pivot 26, and its oscillation movement (arrows F in FIG. 3) is damped by means of a first damper 30.

In the example depicted in FIG. 3, the first damper 30 is a hydraulic piston having a first end connected at a fixed point on the deck 14 and a second end connected to the arm 25 at a point Q close to its lower end. The first damper 30 extends substantially perpendicular to the arm 25. Other arrangements are possible for the first oscillator 30: a plurality of hydraulic pistons may be provided, or the hydraulic piston (or one of them) may be situated above the pivot 26, or the damping effect may be obtained by stirring a viscous medium in which the lower end of the arm 25 is inserted (in a similar fashion to what is described in FR 2 664 920 A1) etc. When the first damper 30 is of the linear type, it is preferable for its connections to the arm 25 and to the fixed point on the deck 14 to be articulated connections, for example of ball-joint type. Thus the linear damper 30 is not subjected to undesirable bending moments when the direction X oscillates about the pivot 26 because of the transverse or axial movements of the stay 16. The arrangement of the linear damper 30 is not necessarily horizontal. Furthermore, its point Q of articulation on the arm 25 may be on an extension of the arm 25 projecting laterally therefrom.

Between the arm 25 and the coupler 27 mounted on the stay 16 at an attachment point P, a slider guide 28 is installed in order to ensure that coupler 27 remains in line with the arm 25. A second linear-stroke damper 31, such as a hydraulic piston, is mounted between the coupler 27 and the arm 25. This damper 31 damps the movement of the attachment point P of the cable 16 parallel to the arm 25.

In the configuration depicted in FIG. 2, the arms of the damping devices 22 are oriented perpendicular to the respective stays 16, the movements of which they damp. This maximizes efficiency of the damping device. Other arrangements are nevertheless possible, for example by disposing the arms 25 vertically (and therefore with an angle other than a right angle relative to their respective stays). In order to damp the vibrations of a stay 16, the device 22 may also have two arms disposed on either side of the vertical plane containing the stay 16.

The guide 28 prevents communication to the piston 31 of undesirable bending forces resulting from movements of the stay 16 perpendicular to the arm 25. It affords decoupling between the damping of the movements parallel to the arm, provided by the damper 31, and damping of the movements perpendicular to the arm, provided by the damper 30. The two dampers 30, 31 may then be designed and optimised independently in order to obtain the damping effects sought.

Figure 4:
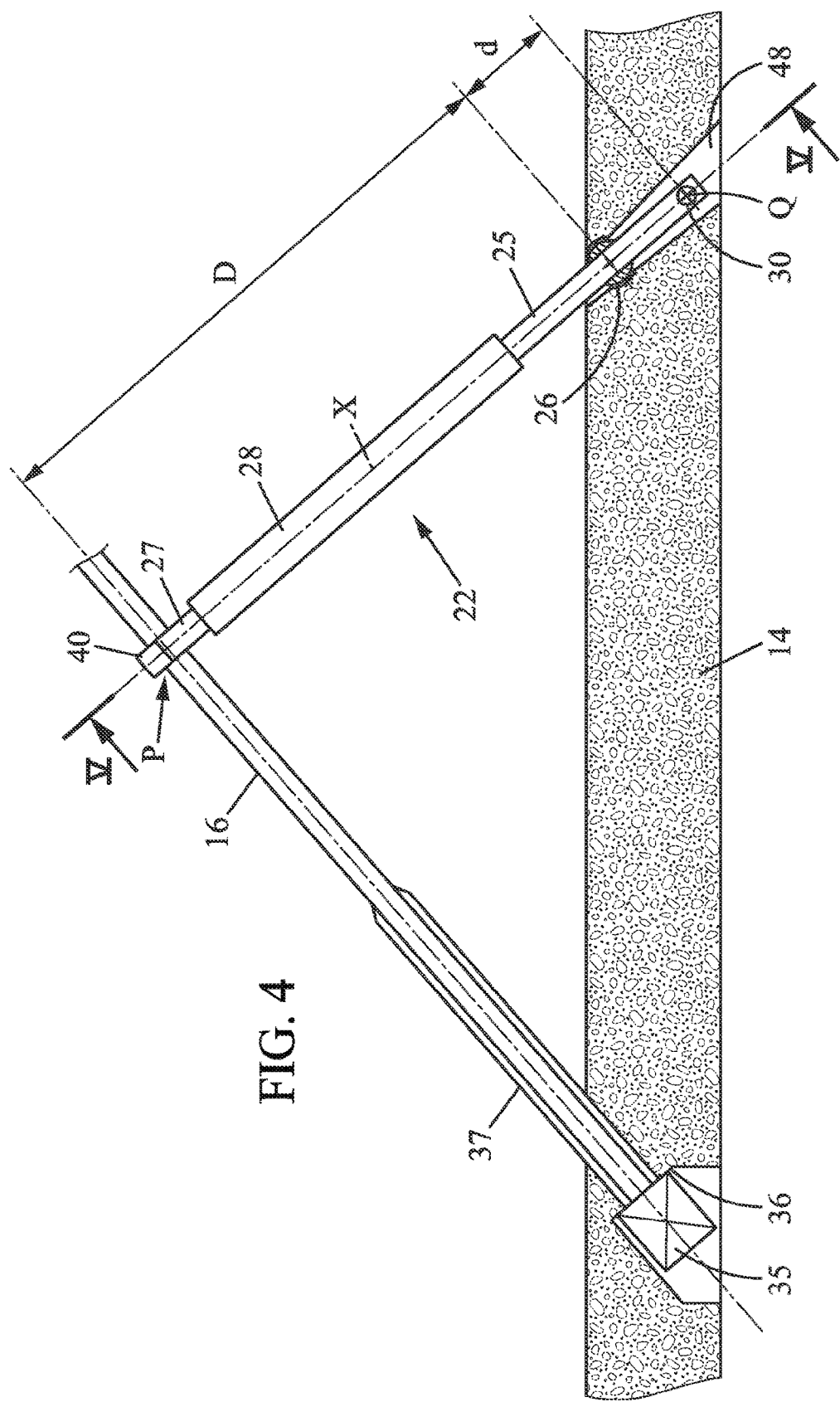
FIG. 4 is a side view of the lower part of a stay cable equipped with a damping device according to an embodiment of the invention.
Figure 5:
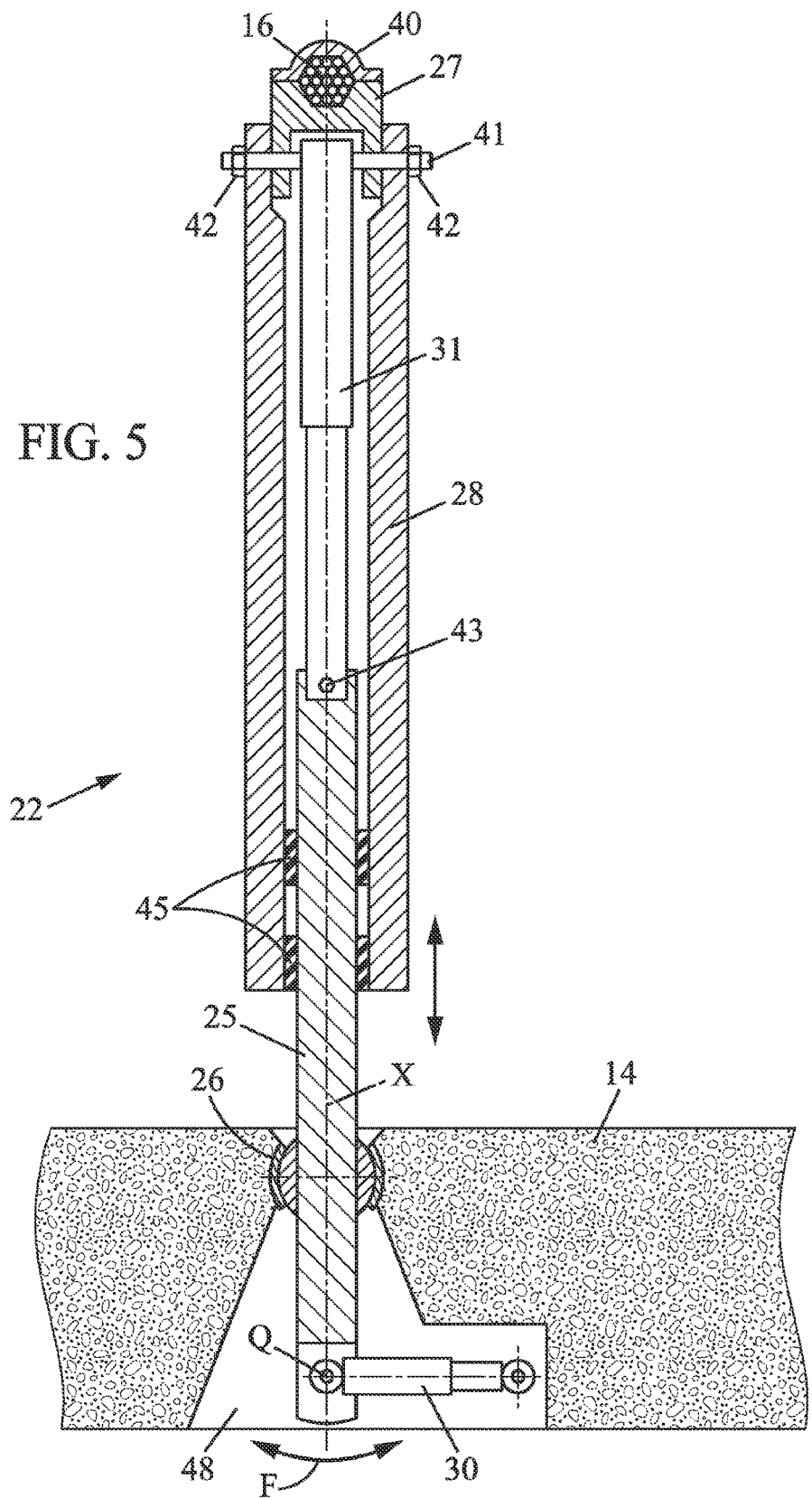
FIG. 5 is a cross-sectional view of the damping device of FIG. 4, along the plane V-V shown in FIG. 4.

FIGS. 4 and 5 show the deck 14 of a bridge held by a cable-stayed suspension, and the zone where one of the stays 16 is anchored on this deck 14. Each stay is a cable consisting typically of a bundle of metallic strands, optionally of the sheathed-waxed or sheathed-greased type. The anchoring device 35 is for example mounted on the underface of the deck 14, where it bears on a surface 36 perpendicular to the trajectory of the stay 16. The stay 16 emerges from the deck 14 in a guide tube 37 that protects its lower part.

The attachment point P of the damping device 22 is situated beyond the guide tube 37. At this point P, a collar 40 is clamped around the bundle of strands constituting the stay 16 in order to fix it to the coupler 27.

In the exemplary embodiment of FIGS. 4 and 5, the slider guide 28 is in the form of a hollow metal profile in which the piston 31 is housed. In this example, a threaded rod 41 and nuts 42 fix the upper ends of the piston 31 and of the guide 28 on the coupler 27. This fixing may be articulated, for example with a ball-joint. Another connection 43, for example of the screw or pin type, connects the lower end of the piston 31 to the upper end of the arm 25. This other connection may be articulated in an identical fashion to the upper fixing.

The arm 25 of the damping device emerges from the guide 28 at its lower end. The guide 28 has, relative to the arm 25, a telescopic movement damped by the piston 31, and does not communicate bending moments to the piston 31. Shoes or sliding bearings 45 are disposed between the arm 25 and the internal face of the guide 28 in order guide the telescopic movement and minimise the coefficient of friction between these two parts, so as not to interfere with the functioning of the damping device 22. These shoes or bearings 45, fixed either to the arm 25 or inside the guide 28, are for example produced from polytetrafluoroethylene (PTFE) or ultra-high molecular weight polyethylene (UHMWPE).

It should be noted that the second damper 31 and the slider guide 28 may have very diverse arrangements.

For example, rather than having a hydraulic piston 31 in the central position surrounded by the guide 28 as in FIGS. 4 and 5, the telescopic movement with respect to the arm 25 may be guided by a central guide with a second linear-stroke damper 31 comprising one or more parallel pistons in an off-centre position, connected to brackets respectively secured to the coupler 27 and to the arm 25.

In the case of FIGS. 4 and 5, the sliding contact (shoes 45) by means of which the guide 28 allows sliding of the coupler 27 with respect to the arm 25 is situated under the lower end of the linear damper 31. It is possible, alternatively, for this sliding contact to be situated above the linear damper 31. For example, the coupler 27 may be mounted so as to slide along rails parallel to the axis X and connected rigidly to the arm 25 oscillating about the pivot 26.

Figure 6:
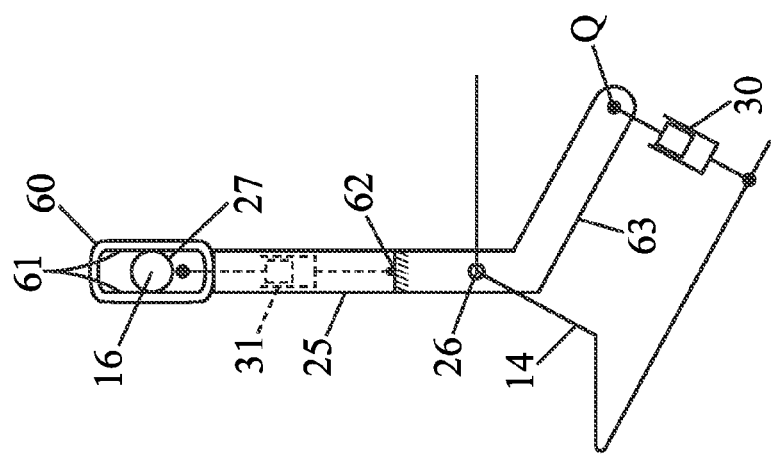

Such an embodiment is illustrated schematically in FIG. 6. In this example, the arm 25 is in the form of a hollow profile in which the damping piston 31 is housed. The latter is connected, preferably in an articulated manner, between the coupler 27 fixed to the stay 16 and a point 62 fixed with respect to the arm 25 and situated near its lower part. The arm 25 is extended at its upper end by a frame 60 that surrounds the stay 16 and the collar 27. This frame 60 here fulfils the role of a guide. Its flanks have two sliding surfaces 61 directed inwards that cooperate with the coupler 27 in order to guide it in its sliding with respect to the arm 25. The sliding surfaces 61 form two rails parallel to the direction X of the arm 25 and are lined with a material with a low friction coefficient in order to facilitate the sliding of the coupler 27. Such an embodiment makes it possible to use a piston 31 with a relatively long stroke.

In the example illustrated by FIG. 6, the arm 25 has, under the pivot 26, an angled extension 63, the end of which is connected in an articulated manner to the first damping piston 30 at the point Q. Such an angled extension enable various possible designs for positioning the damper 30 depending on the constraints of bulk around the edges of the deck 14.

The embodiment illustrated by FIGS. 4 and 5 is advantageous from the aesthetic point of view since only the oscillating arm 25 emerges from the upper face of the deck 14, up to its penetration into the guide 28. The pivot 26 is situated within the thickness of the deck 14, as is the piston of the first damper 30, which is placed on the underface of the deck 14. The lower part of the oscillating arm 15 can move in a cavity 48 of suitable form provided on the bottom side of the deck 14. Similar advantages are obtained with an embodiment of the type shown in FIG. 6.

The pivot 26 is positioned along the arm 25 in order to obtain a lever effect for the action of the first damper 30, which enables the latter to have a compact configuration. For this purpose, the distance D between the pivot and the point of attachment P of the coupler 27 is greater than the lever arm of the piston 30, which is equal to the distance D between the pivot and the point Q of connection of the piston 30 to the arm 25 in the particular configuration shown schematically in FIG. 5 (or approximately equal to the length of the angled extension 63 in the particular configuration shown schematically in FIG. 6). The distance denoted D above is of course variable according to the extension of the piston 31. When it is indicated that D≥d, it must be understood that D is always greater than d, even when the piston D has its minimum length. In order to increase the lever effect, the arm 25 is preferably arranged so as to ensure that D≥3d.

The fact that the pivot 26 is of the ball-joint type enables the device 22 to accept movements of the attachment point P of the stay in a direction perpendicular to the arm 25 in the plane containing the stay 16 and the arm 25. These movements may be due either to vibrations of the stay if the arm 25 is not strictly perpendicular, or to its elongation due to thermal expansion.

Figure 7:
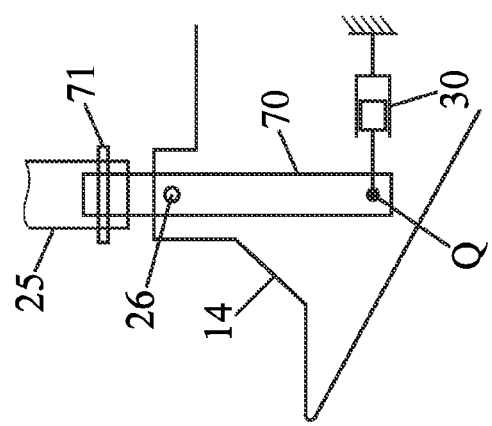

In an alternative embodiment the pivot 26 is implemented by means of an gimbal-type of articulation between the deck 14 and the arm 15, i.e. with two mutually perpendicular articulation axes. Such a variant is illustrated very schematically in FIG. 7. One of the two axes provides the pivot 26 proper by being fixed with respect to the deck 14 and essentially parallel to the vertical plane containing the stay 16, so that the oscillations of the arm 25 that it allows are communicated to the first piston 30 so that it damps them. The second axis 71 of the gimbal articulation is fixed with respect to the arm 25 and essentially perpendicular to the vertical plane containing the stay 16, so that the oscillations of the arm 25 that it allows are absorbed without being communicated to the first piston 30. The arm 25 then has a lower part 70 that is articulated about the axis 71 and is itself articulated with respect to the deck 14 about the perpendicular axis 26. The connection point Q of the first damper 30 is situated at the lower end of the bottom part 70 of the arm 25.

Figure 8:
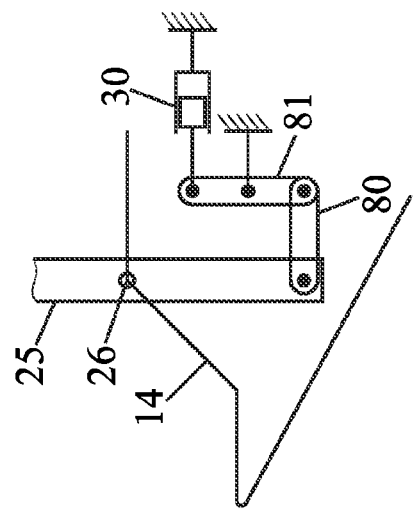
FIGS. 6 to 8 are diagrams illustrating possible variants of the damping device.

Another possible arrangement of the first damper 30 is depicted schematically in FIG. 8. In this example, the first damper 30 is connected to the arm 25 in the deck 14 under the pivot 26 by means of two links 80, 81. The link 80 has one end articulated at the bottom part of the arm 25 and another end articulated at a first end of the link 81. The second end of the link 81 has the articulated connection with the first damper 30. Furthermore, the link 81 has a additional articulation with respect to a fixed point on the deck 14 in a position intermediate between its first and second ends. In the example depicted in FIG. 8, the link 80 extends perpendicular to the arm 25 when the latter is at rest, while the link 81 extends substantially parallel to the arm 25. The links 80, 81 form a mechanism for gearing down the damping force when necessary. It should be noted that very diverse configurations may be proposed in order to act on the relative lever arms of the forces exerted transversely on the arm 25 by the stay 16 subjected to its dynamic forces on the one hand and by the damping piston 30 on the other hand.

The embodiments described and mentioned above are illustrations of the present invention. Various modifications may be made thereto without departing from the scope of the invention that emerges from the accompanying claims.

The invention claimed is:

1. A device for damping vibrations of a cable, the device comprising:
   an arm oscillating about a pivot;
   a first damper for damping at least some of the oscillations of the arm;
   a coupler attached to the cable;
   a second damper having a linear-stroke, an upper end connected to the coupler and a lower end connected to the arm; and
   a guide for letting the coupler slide with respect to the arm parallel to the stroke of the second damper so that movements of the cable transverse to the stroke of the second damper are communicated to the arm independently of the second damper.

2. The damping device as claimed in claim 1, wherein the first damper comprises at least one piston disposed transversely to the arm.

3. The damping device as claimed in claim 2, wherein said piston is connected to the arm below the pivot.

4. The damping device as claimed in claim 2, wherein said piston is placed under an upper face of a structure suspended by means of the cable.

5. The damping device as claimed in claim 4, wherein the pivot is positioned relative to the arm so that a distance between the pivot and the point of attachment of the coupler to the cable is greater than a lever arm, relative to the pivot, of a force exerted by the piston on the arm, and preferably at least three times greater than said lever arm.

6. The damping device as claimed in claim 1, wherein the pivot is placed within a thickness of a structure (14) suspended by means of the cable.

7. The damping device as claimed in claim 1, wherein the pivot provides a ball joint or gimbal type of articulation.

8. The damping device as claimed in claim 1, wherein the pivot is substantially fixed with respect to a structure suspended by means of the cable.

9. The damping device as claimed in claim 1, comprising sliding shoes between the arm and the guide.

10. The damping device as claimed in claim 1, wherein the guide lets the coupler slide with respect to the arm by at least one sliding contact situated under a lower end of the second damper.

11. The damping device as claimed in claim 1, wherein the guide lets the coupler slide with respect to the arm by at least one sliding contact situated above the second damper.

12. The damping device as claimed in claim 11, wherein the arm is hollow and the second linear-stroke damper is housed in the arm while being connected between the coupler and a point fixed with respect to the arm.

13. The damping device as claimed in claim 1, wherein the first damper is connected to the arm via a force gearing-down mechanism.

14. A cable-stayed bridge, comprising:
   at least one towel;
   a deck;
   stays consisting of cables extending obliquely between the tower and the deck in order to suspend the deck; and
   at least one damping device mounted between a cable and the deck,
   wherein the damping device comprises:
      an arm articulated on the deck by a pivot, the arm oscillating about the pivot;
      a first damper for damping at least some of the oscillations of the arm;
      a coupler attached to the cable;
      a second damper having a linear-stroke, an upper end connected to the coupler and a lower end connected to the arm; and
      a guide for letting the coupler slide with respect to the arm parallel to the stroke of the second damper so that movements of the cable transverse to the stroke of the second damper are communicated to the arm independently of the second damper.

* * * * *